United States Patent [19]

Gunzner

[11] 4,335,630

[45] Jun. 22, 1982

[54] HIGH-SPEED MANUFACTURING SYSTEM FOR SABER SAWBLADES AND THE LIKE

[75] Inventor: Fred G. Gunzner, Silverton, Oreg.

[73] Assignee: Acu-Edge, Inc., Woodburn, Oreg.

[21] Appl. No.: 183,000

[22] Filed: Sep. 2, 1980

[51] Int. Cl.³ ............................................. B23D 65/04
[52] U.S. Cl. .................................... 76/25 R; 409/190
[58] Field of Search .............. 76/112, 25 R; 409/190, 409/63

[56] References Cited

U.S. PATENT DOCUMENTS

| | | | |
|---|---|---|---|
| 1,250,377 | 12/1917 | Stevens | 76/112 |
| 2,569,054 | 9/1951 | Herzog | 76/112 |
| 2,768,423 | 10/1956 | Stern | 76/112 |
| 3,038,645 | 6/1962 | Nordlof | 226/149 |

FOREIGN PATENT DOCUMENTS 266525 9/1968 U.S.S.R. ............................... 76/112

*Primary Examiner*—Roscoe V. Parker

*Attorney, Agent, or Firm*—Chernoff & Vilhauer

[57] ABSTRACT

An apparatus for rapidly manufacturing elongate sawblades, such as saber sawblades, from a continuous band of metal. All sequential steps of the manufacturing operation, including tooth-cutting, deburring, tooth-setting and shank-forming are performed prior to the blade being severed from the band of metal so as to avoid the necessity of handling the individual blades separately for any of these operations. All operations are synchronized to the movement of the tooth cutter, the speed of which is maximized by advancing it in a direction perpendicular to the width dimension of the steel band. The outer surface of the tooth portion of each sawblade is heat-treated to provide hardness, but hardening and resultant brittleness of both the core metal of the tooth portion and the entire shank portion of the blade are avoided to preserve their ductility and resistance to breaking. High frequency electrical induction heating of a discrete portion, rather than the entirety, of each blade enables the attainment of these objectives.

10 Claims, 6 Drawing Figures

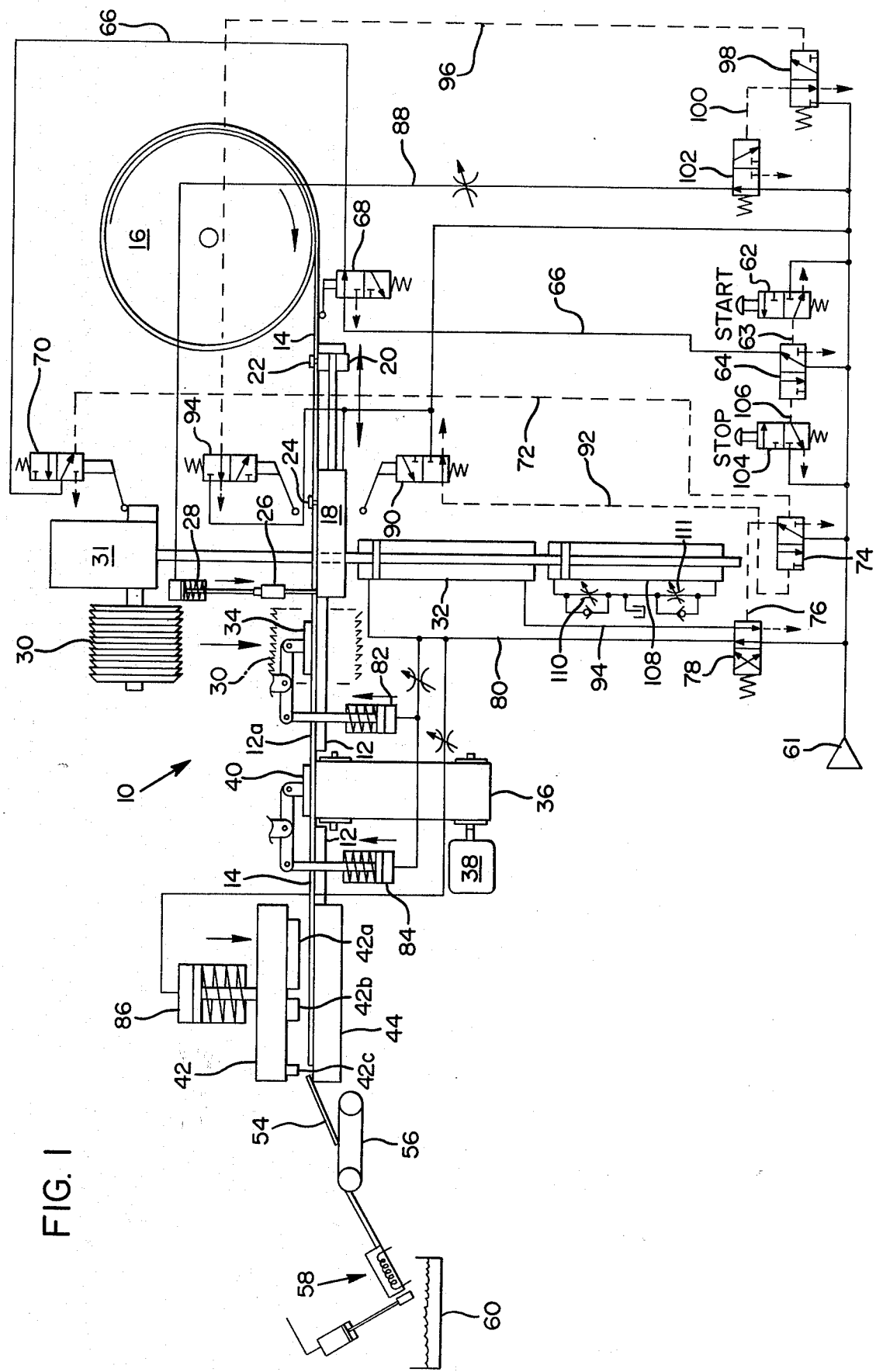
FIG. I

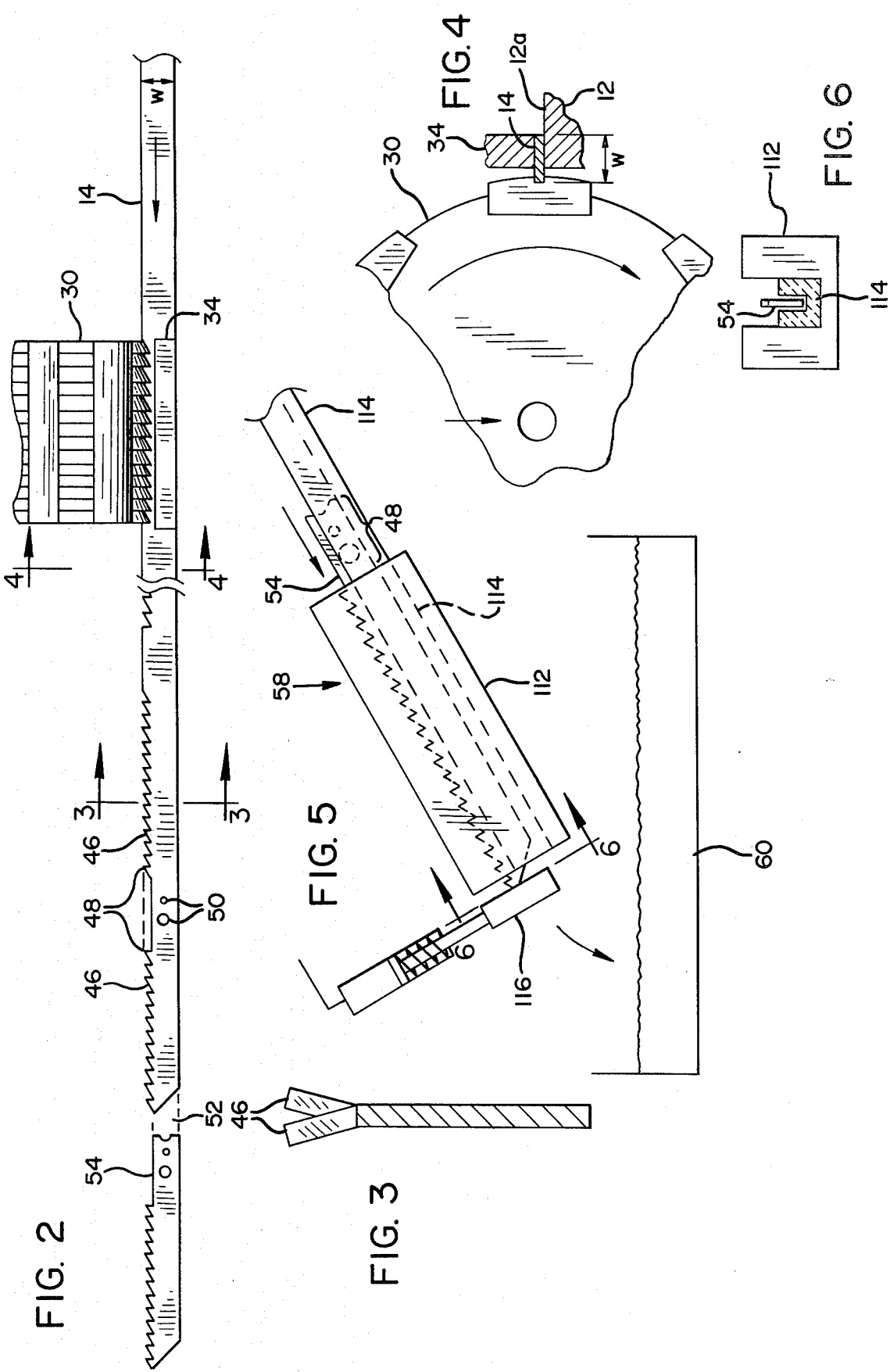

HIGH-SPEED MANUFACTURING SYSTEM FOR SABER SAWBLADES AND THE LIKE

BACKGROUND OF THE INVENTION

This invention relates to improvements in systems for manufacturing elongate sawblades such as saber sawblades. More particularly, the system provides extremely rapid automated manufacture of such blades and improved heat treatment thereof.

In the past, it has been the normal practice to manufacture elongate sawblades such as saber sawblades by punching blanks, having the general exterior configuration of such blades, from sheets of metal, arranging the blanks in a stack to cut teeth into them, deburring the blanks individually, setting (i.e. transversely offsetting) their teeth individually, and hardening them by heating them in an oven to the required "critical" temperature followed by rapid cooling or quenching. In each of the multiple operations described the blades must be handled individually, making the overall manufacturing process slow and expensive. Moreover, hardening of the blades by heating in an oven, followed by rapid cooling, results in hardening of the entire blade, including the shank portion, making the entire blade brittle and highly susceptible to breakage if subjected to excessive bending stress while in use.

In the past it has also been attempted to produce such blades from a continuous band of metal, retaining each blade as part of the integral band until all the manufacturing operations have been performed thereon, after which the blade is severed from the band. While such methodology is far superior to that described in the previous paragraph, the apparatus previously developed for performing such methodology has been extremely complicated, unreliable and difficult to maintain in synchronous operation due in large part to the use of electrical switches and solenoids for controlling pneumatic valves and cylinders. More important, such previous apparatus has not been nearly as rapid as is needed because of the slowness of the tooth-cutting operation wherein a rotary milling cutter is advanced toward the edge of the metal band in a direction parallel with the width dimension of the band. Since, in such an arrangement, the advancement of the cutter determines the depth of the tooth cut, the momentum of the cutter must be closely controlled to prevent too deep or too shallow a cut, at the expense of speed.

SUMMARY OF THE INVENTION

The present invention overcomes the above-described drawbacks of the prior art by providing an extremely rapid and reliable synchronous apparatus for performing all sequential manufacturing operations on the sawblade, except heat treatment, while the blade is still attached to the continuous band of metal from which it is formed. The apparatus automatically feeds the metal band in increments along a support structure in a feeding direction past various stations which are synchronized pneumatically with one another to perform different operations on different sections of the band simultaneously. The speed of the entire manufacturing process is enhanced considerably over the prior art by the fact that all operations are synchronized by the motion of the tooth cutter, the speed of which is increased markedly by advancement of the cutter toward the blade in a direction perpendicular to, rather than parallel to, the width dimension of the metal band. Moreover, synchronization of the various stations is considerably simplified, and its reliability significantly increased, by the elimination of all electrical components and the use of purely fluid-operated, preferably pneumatic, components.

In addition, heat treatment is markedly improved by the substitution of high-frequency electrical induction heating for previous oven heating, and the discrete application of the heat to cause a hardening temperature only in that portion of the blade having sawteeth, and only to a predetermined limited penetration of that portion. This provides surface hardness for the teeth to minimize wear, while maintaining ductility both for the shank portion of the blade and the core metal of the teeth portion to prevent brittleness and minimize consequent breakage.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a schematic diagram of the apparatus of the present invention.

FIG. 2 is an extended top view of the metal band of material from which the sawblades are formed, illustrating sequential steps in the formation of the blade.

FIG. 3 is an enlarged sectional view of the band taken along line 3—3 of FIG. 2.

FIG. 4 is a sectional view of the band taken along line 4—4 of FIG. 2.

FIG. 5 is a simplified side view of the induction heat treatment apparatus of the present invention.

FIG. 6 is a simplified view of the induction heat treatment apparatus taken along line 6—6 of FIG. 5.

DESCRIPTION OF THE PREFERRED EMBODIMENT

The sawblade manufacturing apparatus of the present invention, indicated generally as 10, is shown in schematic form in FIG. 1. The apparatus comprises a support structure 12 having an upwardly-facing surface 12a over which a continuous band 14 of carbon steel or high-speed steel (depending upon whether the blades to be manufactured are for wood cutting or metal cutting respectively) is fed from a reel 16 in a feeding direction from right to left in FIG. 1. The metal band 14, with its width dimension oriented horizontally, is advanced in the feeding direction in successive increments, each slightly greater in length than the length of the sawblades to be manufactured, by a conventional feed apparatus 18 of the type shown in U.S. Pat. No. 3,038,645, which is incorporated herein by reference. In summary, the feed apparatus 18 has a reciprocating head 20 having a selectively-actuated clamp 22 thereon through which the band 14 passes. The body of the feed apparatus has a second selectively-actuated clamp 24 thereon through which the band 14 also passes. When the actuating plunger 26 of the feed apparatus 18 is depressed downwardly by pneumatic cylinder 28, the clamp 24 holds the band 14 in fixed position while the head 20 is extended and clamp 22 is released. Conversely, when plunger 26 is not depressed by cylinder 28, clamp 24 releases the band 14 while clamp 22 grasps it and head 20 retracts a predetermined distance. When the plunger 26 is once more depressed, clamp 24 again grasps the band 14 while clamp 22 releases and head 20 extends in preparation for the next feeding cycle.

Following the feed apparatus 18 along the feeding direction of the band 14 is a rotary milling cutter 30 driven by a motor 31 for forming sawteeth in one longitudinal edge of the band 14. A double-acting pneumatic cylinder 32 advances the cutter 30 vertically downward toward the support structure 12 to form the teeth in the manner best seen in FIGS. 2 and 4. As seen in FIG. 4, the band of metal 14 is supported on the support structure 12 with its width dimension "W" oriented horizontally. This orientation is caused by the orientation of the reel 16 and the grip of the feed apparatus clamps 22 and 24 on the band 14, as well as by the pressure exerted by a selectively-actuated tooth-cutting clamp 34 which holds the band firmly while the cutting takes place. The vertical direction of advancement of the cutter 30 is thus perpendicular to the width dimension "W" of the band 14, permitting the cutter 30 to pass vertically by the band 24 at any desirable advancement speed, intersecting one of the band's longitudinal edges as seen in FIG. 4 without any effect on the configuration or depth of the teeth being formed in the band. This is contrary to the case where the direction of advancement of the cutter is parallel to the width dimension of the band, in which case the cutter would have to be decelerated and stopped at a precise point to produce teeth of proper configuration and depth. After the axis of rotation of the cutter 30 has passed below the level of the band 14, the cylinder 32 retracts the cutter upwardly in the reverse of the direction of advancement preparatory to another cut, which occurs after the feed apparatus 18 has advanced the band 14 by a predetermined increment.

Following the cutter 30 along the feeding direction is a grinding belt 36 powered by an electric motor 38 which, while the cutter is advancing to form sawteeth in a previous portion of the band 14, deburrs the teeth already formed in a subsequent portion of the band 14 in response to downward pressure exerted on the band 14 by a selectively-actuated deburring clamp 40 (FIG. 1).

Following the grinding belt along the feeding direction is a press 42 having three press elements 42a, 42b and 42c respectively which act in conjunction with a die 44 which is part of the support structure 12. Upon downward movement of the press 42, the first press element 42a sets the sawteeth which have been formed by the cutter 30 in a manner as shown in FIG. 3 wherein each of the teeth 46 is deformed transversely out of longitudinal alignment with the next adjacent tooth. The next press element 42b forms the shank portion 48 (FIG. 2) of the next succeeding sawblade increment by punching apertures 50 therein and narrowing the band material to form a shank which is insertable into a saber saw mounting socket. The third element 42c of the press 42 severs the next-succeeding blade increment from the band 14 by removing the material 52 enclosed by the dotted lines in FIG. 2, thereby simultaneously completing the formation of the shank of the next-succeeding sawblade increment and forming a point on the preceding sawblade increment. The finished sawblade 54 is transported by any suitable conveyor 56 to a heat treatment apparatus, designated generally as 58 in FIGS. 1 and 5 respectively, which heats the blade by high-frequency electrical induction heating in a manner to be described more fully hereafter and then quenches the blade in a bath 60 (or by air) to provide surface hardening of the sawteeth.

Having described the overall arrangement of the apparatus 10 and general sequence of operation thereof, the means by which the apparatus 10 performs its functions in a totally automatic and synchronous fashion will now be explained. The control system for the apparatus is entirely pneumatic and is supplied by a source of pressurized air 61. At the start of operation of the apparatus, the cutter 30 is in the raised position and is about to begin its downward advancement upon actuation of the apparatus. Such actuation is accomplished by pushing pneumatic start switch 62 downwardly momentarily. This introduces pressure through pilot line 63, moving main control valve 64 to the left as seen in FIG. 1 and thereby introducing pressurized air into line 66. If the apparatus 10 is supplied with feed stock in the form of band 14, valve 68 interposed in line 66 is held downwardly by the band permitting pressurized air to be introduced to the input side of pneumatic limit switch 70 which is held open against its spring by its abutment with the upwardly-positioned cutter motor 31 as shown in FIG. 1. This permits the introduction of pressurized air through switch 70 into pilot line 72 which causes valve 74 to move to the left as shown in FIG. 1. Such movement of valve 74 introduces pressurized air into pilot line 76 which moves valve 78 to the left against the pressure of its spring. Valve 78 thus introduces pressurized air into line 80 which causes cylinder 32 to begin pulling cutter 30 in a downward advancement toward the support structure 12 and band 14. Meanwhile the cutter clamp actuation cylinder 82, deburring clamp actuation cylinder 84 and press cylinder 86 are all simultaneously extended due to their parallel interconnection with the same line 80 through which pressurized air retracts cylinder 32 downwardly. Thus clamps 34 and 40 are pressed into engagement with the band 14 while 42 is lowered into engagement with the band to perform its above-described threefold operation simultaneously with the downward advancement of the cutter 30. Also, simultaneously with all of the above, cylinder 28 depresses plunger 26 of the feed apparatus 18 under the influence of air pressure through line 88, thereby causing clamp 24 to grip the band 14.

Upon the completion of the downward stroke of the cutter 30, the cutter motor 31 contacts pneumatic limit switch 90, pushing it downward against its spring and introducing pressurized air into pilot line 92 which shifts valve 74 to the right as shown in FIG. 1. This movement of valve 74 relieves the pressure in pilot line 76, permitting valve 78 to be moved to the right under the pressure of its spring. This exhausts the pressure from line 80 and thus from cylinders 82, 84 and 86, permitting their springs to release clamps 34 and 40 and raise press 42. Meanwhile pressurized air is simultaneously introduced into line 94 reversing the vertical direction of cutter 30 and initiating its upward retraction motion.

As the cutter 30 travels upwardly, the cutter motor 31 momentarily contacts pneumatic limit switch 94 pushing it upwardly against its spring. This introduces pressurized air into pilot line 96 which momentarily moves valve 98 to the left as seen in FIG. 1, thereby introducing pressure into pilot line 100 and likewise moving valve 102 to the left against its spring. This movement of valve 102 exhausts the pressure in line 88 thereby relieving the pressure of cylinder 28 on plunger 26 and permitting plunger 26 to rise. This motion of plunger 26 releases clamp 24 of the feed apparatus 18, engages clamp 22 and retracts the head 20 of the feed apparatus thereby feeding the band 14 to the left in FIG. 1 by a predetermined increment. As soon as the cutter motor 31 passes upwardly above limit switch 94, the switch 94 returns to its normal spring-biased position exhausting pilot line 96 and causing both valves 98 and 102 to return to the right thereby introducing pressure once more into line 88 and causing cylinder 28 to depress the plunger 26. The depression of the plunger 26 releases clamp 22 and extends head 20 while engaging clamp 24.

When the cutter 30 reaches the upward limit of its travel the cutter motor 31 once more engages pneumatic limit switch 70 thereby once again introducing pressure into pilot line 72 and shifting valves 74 and 78 to the left to commence downward advancement of the cutter 30, engagement of the clamps 34 and 40, and downward travel of the press 42 in the manner previously described when the apparatus is started.

To stop the apparatus, stop switch 104 is momentarily depressed against its spring, thereby introducing pressurized air through pilot line 106 to shift valve 64 to the right and thereby relieve pressure in line 66. Alternatively, the same stopping effect occurs if the supply of band 14 is exhausted and valve 68 is permitting to move upwardly. In either case, it will be noted that if the cutter 30 is already advancing toward the band 14 when the stop actuation occurs, the downward advancement of the cutter 30 and the simultaneous operation of the clamps 34 and 40 and press 42 will continue in a normal fashion until the cutter has completed its downward travel, tripped limit switch 90, and returned to its raised position at which time it will not repeat its downward advancement due to the absence of pressure in line 66.

The speed of the entire apparatus is controlled by a damping cylinder 108 having hydraulic fluid therein which exhausts at a controlled flow rate from each side of the cylinder under the regulation of variable restrictions 110 and 111. Adjustment of the restrictions 110 and 111 for high speed is feasible because the limits of vertical travel of the cutter 30, and thus its momentum, are not critical to the proper depth of the sawteeth, such limits being somewhat imprecise and unreliable at higher vertical travel speeds due to the momentum of the cutter and the cutter motor.

The heat treatment apparatus to which each finished sawblade 54 is conveyed is shown in simplified form in FIGS. 5 and 6. A U-shaped electrical induction heating coil 112 of conventional design supplied by a conventional highfequency source of intermittent electrical current (not shown) is supported in a downwardly-sloped orientation above a quenching bath 60. The interior of the U-shaped coil 112 has a ceramic liner 114 which protrudes beyond the upper end of the coil 112 and has an upwardly-opening slot formed along its length for holding a sawblade 54 and electrically insulating the sawblade 54 from the coil 112. To heat the sawblade 54, the blade is slid down the slotted liner 114 into the coil 112 where its travel is stopped by a pneumatically-actuated gate 116. Current is then applied for a predetermined period of time to heat the blade, after which the gate 116 is immediately retracted and the blade 54 allowed to slide downwardly into the quenching bath 60 (or cooled by air jets as the case may be).

An important point regarding the heat treatment is that the use of high-frequency induction heating permits the blade 54 to be heated to its critical hardening temperature only over a particular portion of the blade, i.e. the tooth portion, and only to a predetermined depth of penetration. Simultaneous heating of the shank portion 48 of the blade 54 to its critical hardening temperature is avoided by virtue of the fact that the coil 112 is shorter than the blade 54 so that the shank 48 protrudes from the coil during the heating process. Thus, upon subsequent cooling of the blade, only the tooth portion is hardened while the ductility of the shank portion 48 is preserved to make it more resistant to breakage.

Moreover the amount of heating provided by the coil 112 can be closely regulated by the time period during which current is supplied to the coil, thereby making it possible to heat only the surface of the tooth portion to the critical hardening temperature, leaving the core material of the tooth portion at a lower temperature and thereby preserving its ductility upon cooling to resist breakage of the tooth portion of the blade.

By way of example, if the blade 54 is a wood-cutting blade made of carbon steel, the surface of the tooth portion, to a penetration of approximately five or six thousandths of an inch on each side, can be raised to its critical hardening temperature of 1500°–1600° F. by applying current to the coil for approximately one second. Since the blade is forty thousandths of an inch thick, approximately threequarters of its thickness will not be raised to the critical temperature and therefore will not become brittle and susceptible to easy breakage. An oil quench would normally be used for such a steel.

As a further example, if the blade 54 is intended for metal cutting, a high-speed steel would be used, the surface of which to a penetration of five or six thousandths of an inch will be heated to its critical hardening temperature of 2400°–2500° F. by an application of electric current for two to three seconds. Once again the core material of the tooth portion of the blade would not be heated to such a high temperature, and brittleness thereof would be avoided. Air quenching would normally be used for this type of steel.

In both cases of course, heating of the shank portion 48 of the blade to the foregoing temperatures is avoided due to its protrusion from the coil 112, and brittleness of the shank portion is therefore likewise avoided while surface hardness of the teeth is ensured.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Improved apparatus for rapidly manufacturing multiple elongate sawblades from a continuous elongate band of metal having longitudinal edges and a predetermined width dimension, said apparatus comprising:
   (a) a support structure;
   (b) feeder means for feeding said band of metal longitudinally in successive increments along said support structure in a feeding direction while orienting the width dimension of said band of metal in a predetermined direction perpendicular to said feeding direction;
   (c) rotary cutter means for forming sawteeth in one longitudinal edge of said band of metal;
   (d) means for selectively advancing said rotary cutter means toward said support structure along a direction of advancement substantially perpendicular both to said feeding direction and to said predetermined direction so as to cause said cutter means to intersect one longitudinal edge of said band of metal; and (e) selectively-actuated severing means, located in a position following the position of said rotary cutter means along said feeding direction, for successively severing each respective sawblade from said band of metal concurrently with the advancement of said rotary cutter means toward said support structure along said direction of advancement.

2. The apparatus of claim 1 including means for moving said severing means toward said support structure along a direction parallel to said direction of advancement.

3. The apparatus of claim 1 including forming means located along said feeding direction between said rotary cutter means and said severing means for forming a sawblade shank portion on said band of metal concurrently with the advancement of said rotary cutter means toward said support structure.

4. The apparatus of claim 1 including teethsetting means located along said feeding direction between said rotary cutter means and said severing means for deforming adjacent ones of said sawteeth out of longitudinal alignment with each other concurrently with the advancement of said rotary cutter means toward said support structure.

5. The apparatus of claim 1 including a first fluid piston and cylinder assembly for advancing said rotary cutter means toward said support structure along said direction of advancement, and a second fluid piston and cylinder assembly for actuating said severing means to sever a sawblade from said band of metal, further including a source of fluid under pressure and fluid valve and conduit means for selectively directing fluid under pressure from said source to both said first and second fluid piston and cylinder assemblies simultaneously so as to begin advancing said rotary cutter means along said direction of advancement while simultaneously actuating said severing means to sever a sawblade from said band of metal.

6. The apparatus of claim 1 including a doubleacting fluid piston and cylinder assembly for alternatively advancing said rotary cutter means along said direction of advancement or retracting said rotary cutter means along said direction of advancement, a source of fluid under pressure, fluid valve means for selectively directing fluid under pressure from said source alternatively to one or the other side of the piston of said double-acting fluid piston and cylinder assembly, and fluid pilot means connected to said valve means for controlling said valve means by the selective pressurizing or depressurizing of said fluid pilot means in response to the movement of said rotary cutter means along said direction of advancement, said fluid pilot means including means for sensing the position of said rotary cutter means along said direction of advancement.

7. The apparatus of claim 1 including means for selectively retracting said rotary cutter means along said direction of advancement, further including fluid-actuated means for selectively actuating said feeder means to feed said band of metal in said feeding direction, and fluid pilot means connected to said fluid-actuated means for controlling said fluid-actuated means by selective pressurizing or depressurizing of said fluid pilot means in response to the movement of said rotary cutter means along said direction of advancement, said fluid pilot means including means responsive to the position of said rotary cutter means along said direction of advancement.

8. The apparatus of claim 7 wherein said fluid pilot means includes means for causing said feeder means to feed said band of metal in said feeding direction while said rotary cutter means is being retracted along said direction of advancement.

9. The apparatus of claim 1 including adjustable fluid damping means having an adjustable fluid restriction therein for adjustably regulating the speed of advancement of said rotary cutter means along said direction of advancement.

10. The apparatus of claim 1 including means for selectively retracting said rotary cutter means along said direction of advancement, further including means for sensing the presence or absence of said band of metal on said support structure for preventing the initiation of advancement of said rotary cutter means along said direction of advancement while permitting retraction of said cutter means along said direction of advancement.

* * * * *

UNITED STATES PATENT AND TRADEMARK OFFICE
CERTIFICATE OF CORRECTION

PATENT NO. : 4,335,630
DATED : June 22, 1982
INVENTOR(S) : Fred G. Gunzner

It is certified that error appears in the above-identified patent and that said Letters Patent are hereby corrected as shown below:

| | |
|---|---|
| Col. 3, line 20 | Change "24" to --14--. |
| Col. 4, line 35 | After "while" insert the word --press--. |
| Col. 5, line 49 | Change "highfrequency" to --high-frequency--. |
| Col. 6, line 25 | Change "threequarters" to --three-quarters--. |
| Col. 7, line 22 | Change "teethsetting" to --teeth-setting--; |
| Col. 7, line 44 | Change "doubleacting" to --double-acting--. |

Signed and Sealed this

Thirty-first Day of August 1982

[SEAL]

Attest:

Attesting Officer

GERALD J. MOSSINGHOFF

Commissioner of Patents and Trademarks